US009696028B2

(12) United States Patent
Patrick et al.

(10) Patent No.: US 9,696,028 B2
(45) Date of Patent: *Jul. 4, 2017

(54) MODULE-BASED OXY-FUEL BOILER

(71) Applicant: Jupiter Oxygen Corporation, Schiller Park, IL (US)

(72) Inventors: Brian R. Patrick, Chicago, IL (US); Tom L. Ochs, Albany, OR (US); Danylo B. Oryschyn, Philomath, OR (US); Cathy A. Summers, Albany, OR (US)

(73) Assignee: Jupiter Oxygen Corporation, Schiller Park, IL (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/288,899

(22) Filed: May 28, 2014

(65) Prior Publication Data

US 2014/0261245 A1 Sep. 18, 2014

Related U.S. Application Data

(63) Continuation of application No. 13/335,238, filed on Dec. 22, 2011, now Pat. No. 8,752,383, and a (Continued)

(51) Int. Cl.
*F22B 31/04* (2006.01)
*F22G 3/00* (2006.01)
(Continued)

(52) U.S. Cl.
CPC ............... *F22B 31/04* (2013.01); *F01K 3/24* (2013.01); *F01K 7/22* (2013.01); *F22G 1/16* (2013.01);
(Continued)

(58) Field of Classification Search
CPC .... F22B 31/04; F22G 3/00; F22G 1/16; F23C 9/00; F23L 7/007; F01K 7/22; F01K 3/24; Y02E 20/344
USPC .................................. 60/653, 660, 676–679
See application file for complete search history.

(56) References Cited

U.S. PATENT DOCUMENTS 2,886,421 A * 5/1959 Dickinson ................ C10J 3/485
48/197 R
4,060,990 A * 12/1977 Guido ...................... F01K 9/04
60/676

(Continued)

*Primary Examiner* — Hoang Nguyen
(74) *Attorney, Agent, or Firm* — Katten Muchin Rosenman LLP

(57) ABSTRACT

A boiler system for producing steam from water includes a plurality of serially arranged oxy fuel boilers. Each boiler has an inlet in flow communication with a plurality of tubes. The tubes of each boiler form at least one water wall. Each of the boilers is configured to substantially prevent the introduction of air. Each boiler includes an oxy fuel combustion system including an oxygen supply for supplying oxygen having a purity of greater than 21 percent, a carbon based fuel supply for supplying a carbon based fuel and at least one oxy-fuel burner system for feeding the oxygen and the carbon based fuel into its respective boiler in a near stoichiometric proportion. The oxy fuel system is configured to limit an excess of either the oxygen or the carbon based fuel to a predetermined tolerance. The boiler tubes of each boiler are configured for direct, radiant energy exposure for energy transfer. Each of the boilers is independent of each of the other boilers.

13 Claims, 4 Drawing Sheets

Related U.S. Application Data continuation of application No. 12/399,411, filed on Mar. 6, 2009, now Pat. No. 8,082,737, and a continuation of application No. 11/070,177, filed on Mar. 1, 2005, now Pat. No. 7,516,620.

(51) Int. Cl.
*F01K 3/24* (2006.01)
*F01K 7/22* (2006.01)
*F22G 1/16* (2006.01)
*F23C 9/00* (2006.01)
*F23L 7/00* (2006.01)

(52) U.S. Cl.
CPC ............... *F22G 3/00* (2013.01); *F23C 9/00* (2013.01); *F23L 7/007* (2013.01); *Y02E 20/344* (2013.01)

(56) References Cited

U.S. PATENT DOCUMENTS

| | | | | |
|---|---|---|---|---|
| 4,870,823 A * | 10/1989 | Silvestri, Jr. | ............. | F22G 5/02 60/652 |
| 6,436,337 B1 * | 8/2002 | Gross | ............. | C22B 9/16 266/200 |
| 7,516,620 B2 * | 4/2009 | Patrick | ............. | F01K 3/24 60/653 |
| 8,082,737 B2 * | 12/2011 | Patrick | ............. | F01K 3/24 60/653 |
| 8,752,383 B2 * | 6/2014 | Patrick | ............. | F01K 3/24 60/653 |

\* cited by examiner

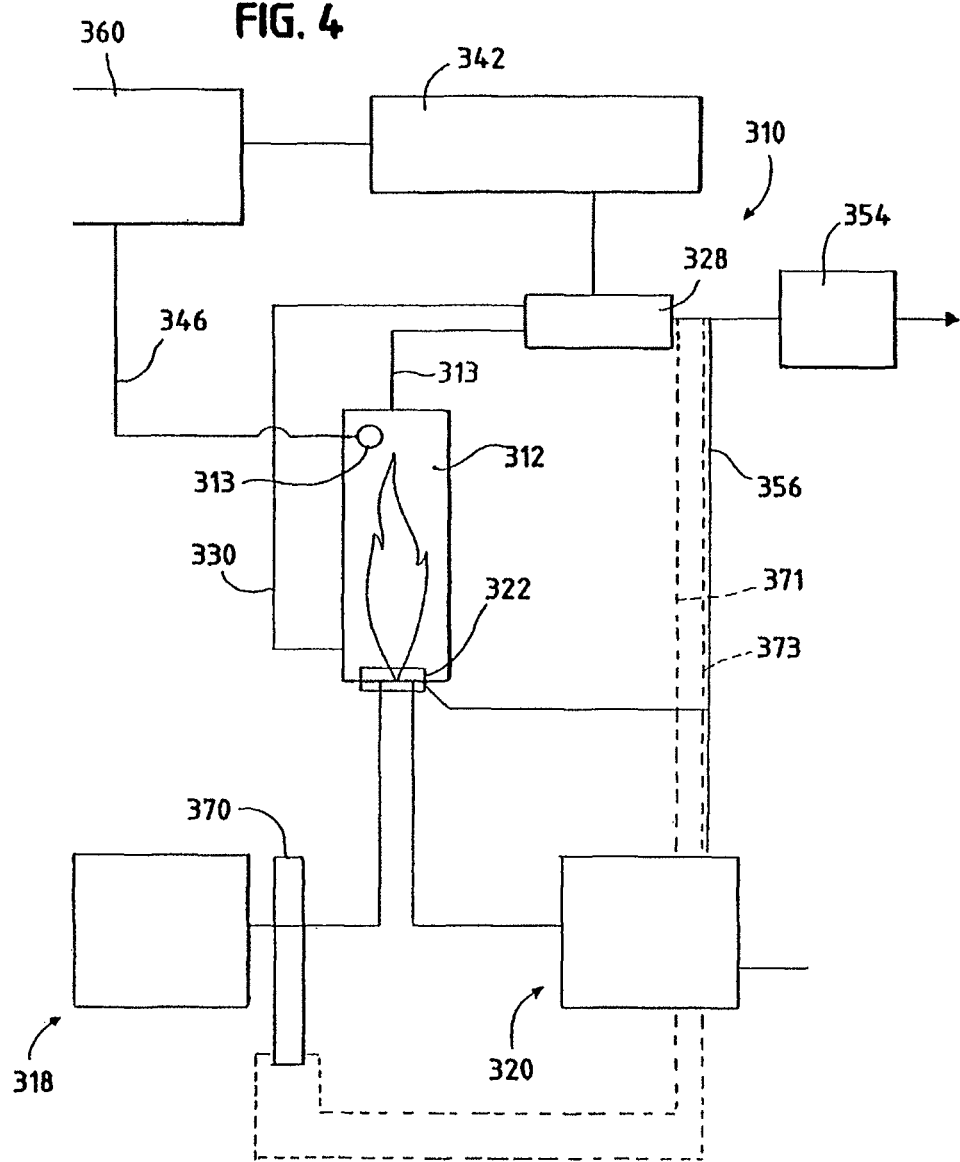

MODULE-BASED OXY-FUEL BOILER

CROSS-REFERENCE TO RELATED APPLICATIONS

This application is a continuation of commonly owned U.S. patent application Ser. No. 13/335,238, filed on Dec. 22, 2011, which, in turn, is a continuation of U.S. patent application Ser. No. 12/399,411, filed on Mar. 6, 2009, now U.S. Pat. No. 8,082,737, which, in turn, is a continuation of U.S. patent application Ser. No. 11/070,177, filed on Mar. 1, 2005, now U.S. Pat. No. 7,516,620.

TECHNICAL FIELD

The present invention pertains to an oxygen fueled boiler. More particularly, the present invention pertains to a module-based oxy-fuel boiler having a flexible design.

BACKGROUND

The advantages of oxy-fuel combustion systems are well recognized. For example, Gross, U.S. Pat. Nos. 6,436,337 and 6,596,220, provide that some of the advantages of oxy-fuel combustion systems are reduced environmental pollution (reduced NOx generation), high efficiency, high flame temperatures and smaller overall physical plant design. The Gross patents, which are commonly owned with the present application are incorporated herein by reference.

In order to extract the energy from the fuel, boilers typically provide some manner in which energy is input to a fluid (through combustion of the fuel) generally to change the state of the fluid. Energy is then extracted from the fluid typically in the form of mechanical movement (or kinetic energy). Most boilers use water as the working fluid to extract energy from the fuel. Water is passed through tubes that form one or more "walls" or bundles within the boiler.

Typically, boiler tube walls are designed to transfer energy (in the form of heat) through the tube wall into the water in several loops and passes of the walls. As the water passes through the tubes, the water is heated, under pressure and brought to a high level of energy (and phase change) through super-heat, re-heat and/or super critical stages. Other stages, such as an economizer unit may also be used through which water is passed in furnace wall sections prior to super-heat passes. The water is further heated by convective heat transfer from the heated gases flowing past the tube bundles (e.g., in the economizer).

Each of the stages or regions of the boiler is designed to operate based upon a certain type of heat transfer mechanism or phenomena. For example, the lower furnace walls are designed for radiant heat transfer whereas the upper bundles, super-heat, re-heat and economizer sections are designed to function on a convective heat transfer principle. It will be recognized by those skilled in the art that the heat transfer mechanisms are not exclusive of one another as water is heated in the boiler.

Although such boiler configurations continue to serve their applications and purposes well, they do not necessarily take full advantage of the high flame temperatures and low exhaust gas volumes of oxy-fuel combustion systems. Accordingly, there is a need for a boiler that uses an oxy-fuel combustion system to reduce environmental pollution. Desirably, such a boiler design provides high efficiency (vis-á-vis a high ratio of heat transferred to the working fluid to the heat available from the combustion products) and makes use of high flame temperatures. Most desirably, such a boiler configuration can provide a smaller overall physical plant design.

SUMMARY OF THE INVENTION

A module based boiler system uses a plurality of independent, serially configured oxy fuel boilers for producing steam from water. The boilers are configured to carry out a different energy transfer function from one another. A first or main boiler has a feedwater inlet in flow communication with a plurality of tubes for carrying the water. The boilers are configured to substantially prevent the introduction of air.

The tubes of the main boiler form at least one water wall. Each boiler includes an oxygen supply for supplying oxygen having a purity of greater than 21 percent and preferably at least about 85 percent, a carbon based fuel supply for supplying a carbon based fuel and at least one oxy-fuel burner system. The burner system feeds the oxygen and fuel into the boiler in a near stoichiometric proportion to limit an excess of either the oxygen or the carbon based fuel to a predetermined tolerance. The tubes of each boiler are configured for direct, radiant energy exposure for energy transfer from the flame to the water wall tubes. In deference to traditional nomenclature, reference to water walls is intended to include all boiler tubes in a radiant zone even though the tubes may carry steam.

In one embodiment of the boiler system, the second boiler is a superheat boiler and steam produced by the first boiler is fed directly to the superheat boiler. Steam exits the superheat boiler and flows to a main steam turbine. Alternately, the system can include a reheat boiler (which takes feed from the high pressure steam turbine exhaust), reheats the steam in an oxy fuel boiler similar to the main boiler, and feeds a reheat steam turbine. The energy transfer or heating function of each of the boilers is different from each of the other boilers. That is, in the main boiler, water is heated from a relatively low energy (enthalpy) value to saturated steam. In the superheat boiler (if used), the steam is further heated to superheated conditions. Then, in the reheater, the exhaust steam from the high pressure turbine is reheated for feeding to a reheat steam turbine.

The boiler system can include a condenser configured such that steam exhausts from the high pressure steam turbine to one or more reheat steam turbines to optionally one or more low pressure turbines and on to the condenser. A preferred boiler system includes an economizer. The economizer has a gas side that receives combustion products ("exhaust gases" or "flue gases") from the boilers and a feedwater side such that the combustion products preheat the boiler feedwater prior to introducing the feedwater to the main boiler. Following exhaust from the economizer, the exhaust gases can be used to preheat the oxidizing agent for the oxy-fuel combustion system, generally tying in to the exhaust gases system prior to any downstream exhaust gas processing treatment that may be desired. Increased power can be achieved by parallel groupings of modular boiler systems.

The oxy-fuel burners can be configured for many different types of fuel, such as natural gas, oil, coal and other solid fuels. When using a solid fuel, a portion of the exhaust gases (optionally mixed with oxygen) can be used to carry the solid fuel into the boilers. The fuel feed gases can be exhaust gases from downstream of the economizer.

These and other features and advantages of the present invention will be apparent from the following detailed description, in conjunction with the appended claims.

DESCRIPTION OF THE DRAWINGS

The benefits and advantages of the present invention will become more readily apparent to those of ordinary skill in the relevant art after reviewing the following detailed description and accompanying drawings, wherein:

FIG. 4 is a schematic flow diagram of a saturated steam boiler system having a module based oxy fuel boiler embodying the principles of the present invention.

DETAILED DESCRIPTION

Figure 1:
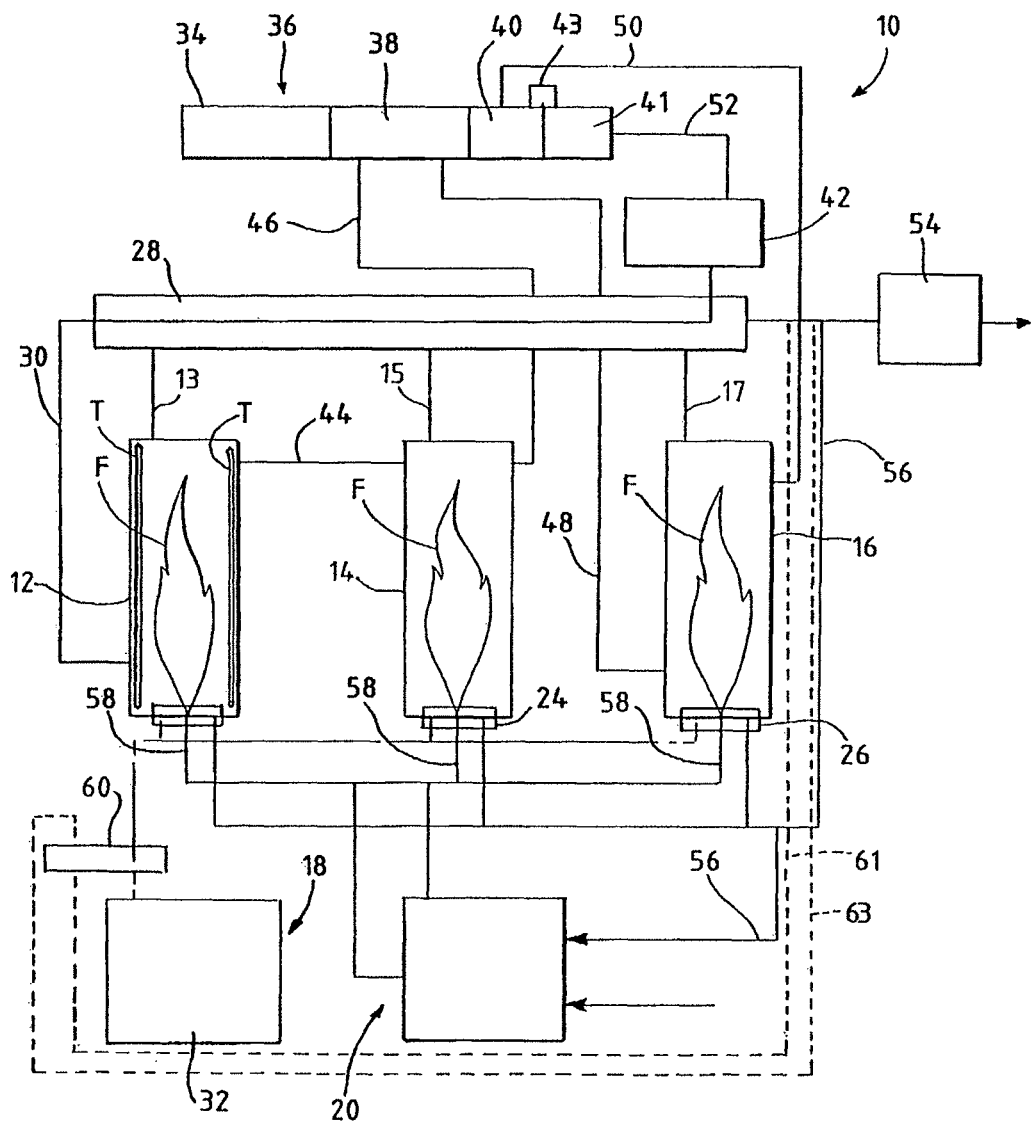
FIG. 1 is a schematic flow diagram of a single reheat/subcritical boiler system having module based oxy fuel boilers embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

An oxy-fuel combustion system uses essentially pure oxygen, in combination with a fuel source to produce heat, by flame production (i.e., combustion), in an efficient, environmentally non-adverse manner. Such a combustion system provides high efficiency (vis-á-vis a high ratio of heat transferred to the working fluid to the heat available from the combustion products) combustion and makes use of high flame temperatures. A preferred combustion system uses oxygen at a relatively high purity (above about 21 percent and preferably at least about 85 percent oxygen) and as such the overall volume of gas that passes through the boiler is commensurately lower. Using oxy-fuel, flame temperatures of greater than about 3000° F. and up to about 5000° F. in the boiler are anticipated.

Moreover, one of the operational parameters of the present boiler system is the use of an oxy-fuel combustion system in which relatively pure oxygen, rather than air, is used as the oxidizing agent. As used herein, oxidizing agent is intended to mean the gas that carries in the oxygen for combustion. For example, when pure (100 percent) oxygen is supplied to the system, the oxygen comprises 100 percent of the oxidizing agent, whereas when air is used as the oxidizing agent, oxygen comprises about 21 percent of the oxidizing agent. Thus, the volume of oxidizing agent that is needed is significantly less (because substantially only oxygen is used rather than air) than conventional boilers, which results in a gas volume input (and thus throughput) to the boiler that is lower and a gas flow rate through the boiler that is lower than conventional boilers. One major advantage afforded by a lower flow rate and volume is that the overall size of the physical plant system could be smaller than conventional boiler systems and as such the capital cost of such a boiler system is anticipated to be commensurately lower.

One of the functional aspects or functional goals of the present boiler system is to extract a maximum amount of energy (in the form of heat transfer from the combustion products/exhaust gases) from the combustion process. This, in conjunction with the lower flow rate, provides less energy loss at comparable exhaust gas stack temperatures.

Another aspect or functional goal of the present invention is to make the maximum practicable use of the higher flame temperatures. As such, as will be described below, a considerably larger proportion of the heat transfer from the combustion products to the boiler tubes and hence to the working fluid (water or steam) takes place by radiant heat transfer, rather than convective heat transfer.

A schematic illustration of one embodiment of a boiler system 10 is shown in FIG. 1. The illustrated system 10 is a reheat/subcritical unit. The system includes three separate and distinct boilers, namely boiler No. 1 (main boiler 12); for producing steam from water, boiler No. 2 (superheat boiler 14) for producing superheated steam, and boiler No. 3 (reheat boiler 16). Oxygen and fuel are fed to each of the boilers by oxidizing agent and fuel supply systems 18, 20.

As illustrated schematically, and as will be discussed below, each of the boilers 12, 14, 16 includes its own independent oxy-fuel combustion system 22, 24, 26. In such an oxy-fuel combustion system, the water walls (tubes T see boiler 12 in FIG. 1) of each boiler 12-16 are sufficiently exposed to the flame that the major portion of heat transfer takes place by a radiant heat transfer mechanism rather than a convective transfer mechanism. That is, the majority of the heat transfer occurs due to the direct flame exposure of the tubes, rather than the movement of heated exhaust gases over the tubes. This preferred radiant heat transfer mechanism is in sharp contrast to conventional boilers that use large, long and complex exhaust gas flow paths (through convective passes, convective superheat passes, economizer sections and the like), to maximize heat transfer trough convective mechanisms.

The present boiler system 10 further includes an economizer 28 that transfers energy from boiler flue gases (preferably in all of the boilers) to the main boiler feed water (at the feedwater line 30) to preheat the feed water prior to introduction to the main boiler 12. In a present system, oxygen is produced by separation from, for example, air in an oxygen generator 32. Those skilled in the art will recognize the various ways in which oxygen can be provided for feeding to the boilers 12-16, for example, that oxygen can be supplied from sources such as storage, water separation and the like, all of which are within the scope of the present invention. The fuel supply 20 can be any of various types of fuels and various types of supplies. For example, the fuel can be a gaseous fuel (e.g., natural gas), a liquid fuel such as fuel oil, diesel oil, or other organic or inorganic based liquid fuels, or a solid fuel such as coal, agricultural or livestock byproducts. All such oxygen production and supply configurations 18 as well as all such fuels and fuel supply arrangements 20 are within the scope and spirit of the present invention.

Returning now to FIG. 1, the boiler system 10 is shown as a supply for an electrical generator 34. To this end, the system includes a turbine/generator set 36 having the electrical generator 34, a high pressure or main steam turbine 38, an intermediate pressure steam turbine 40, a low pressure steam turbine 41 and a condenser 42.

The system 10 is configured such that feedwater enters the main boiler through feed water line 30 and is heated as it flows through the boiler 12 water tubes T. In a typical boiler configuration, water enters the boiler 12 at a relatively low location in the boiler and rises through the tubes as it is heated. This serves to maintain the tubes in a flooded state and to maintain the fluid in the tubes at pressure.

The heated fluid is separated and saturated steam exits the main boiler 12 through line 44 and enters the superheat boiler 14. Here, the steam is further heated to superheated conditions, again flowing through wall tubes. The superheated steam exits the superheat boiler 14 through main steam line 46 and enters the high pressure (main steam) turbine 38. The lower pressure steam exhausts from the high pressure main steam turbine 38 and is returned to the reheat boiler 16 through the reheat steam line 48. The steam exits the reheat boiler 16 through reheat steam flow line 50 and enters the intermediate pressure turbine. The steam exhausted from the intermediate turbine 40 flow through cross-over line 43 and enters the low pressure turbine 41.

The steam exhausts from the low pressure turbine 41 through the turbine exhaust line 52 and is fully condensed in the condenser 42 (generally at a low pressure—lower than atmospheric Pressure—so that a maximum amount of energy is extracted by the turbine 40 from the steam) and is then returned (pumped) to the main boiler 12 through the economizer 28 which (as set forth above) preheats the water prior to introduction to the boiler 12.

As to the fuel circuit, as stated above, fuel and oxidizing agent are fed into each of the boilers 12, 14 and 16 independently. The flue gases all exit their respective boilers through lines 13, 15 and 17, respectively, and enter the economizer 28 in which the gases preheat the main boiler feedwater. The flue gases exit the economizer 28 and can be used to preheat the oxidizing agent in oxidizing agent preheater 60. The exhaust gases, after exiting the economizer 28 are routed to the oxidizing agent preheater 60 (through line 61) and are then returned (through line 63) for introduction to any necessary downstream processing equipment indicated generally at 54, such as scrubbers, precipitators or the like. Additionally, in the event that it is desired, a portion of the flue gas can be recirculated, generally following oxidizing agent preheat, (through flue gas recirculation lines 56) to the boilers 12-16. The recirculation lines 56 can also be used as a vehicle (by diversion to fuel carrying lines 58) to carry fuel into the boilers 12-16 to, for example, carry pulverized coal into the boilers.

As will be appreciated by those skilled in the art, because the flow rate and overall volume of gas entering the boiler (as substantially pure oxygen) is less than conventional boilers, the flow rate and volume of exhaust or flue gas is also commensurately less than conventional boilers. As such the downstream processing equipment 54 can be smaller and less costly than conventional equipment of an equal sized (power output) power plant.

Figure 2:
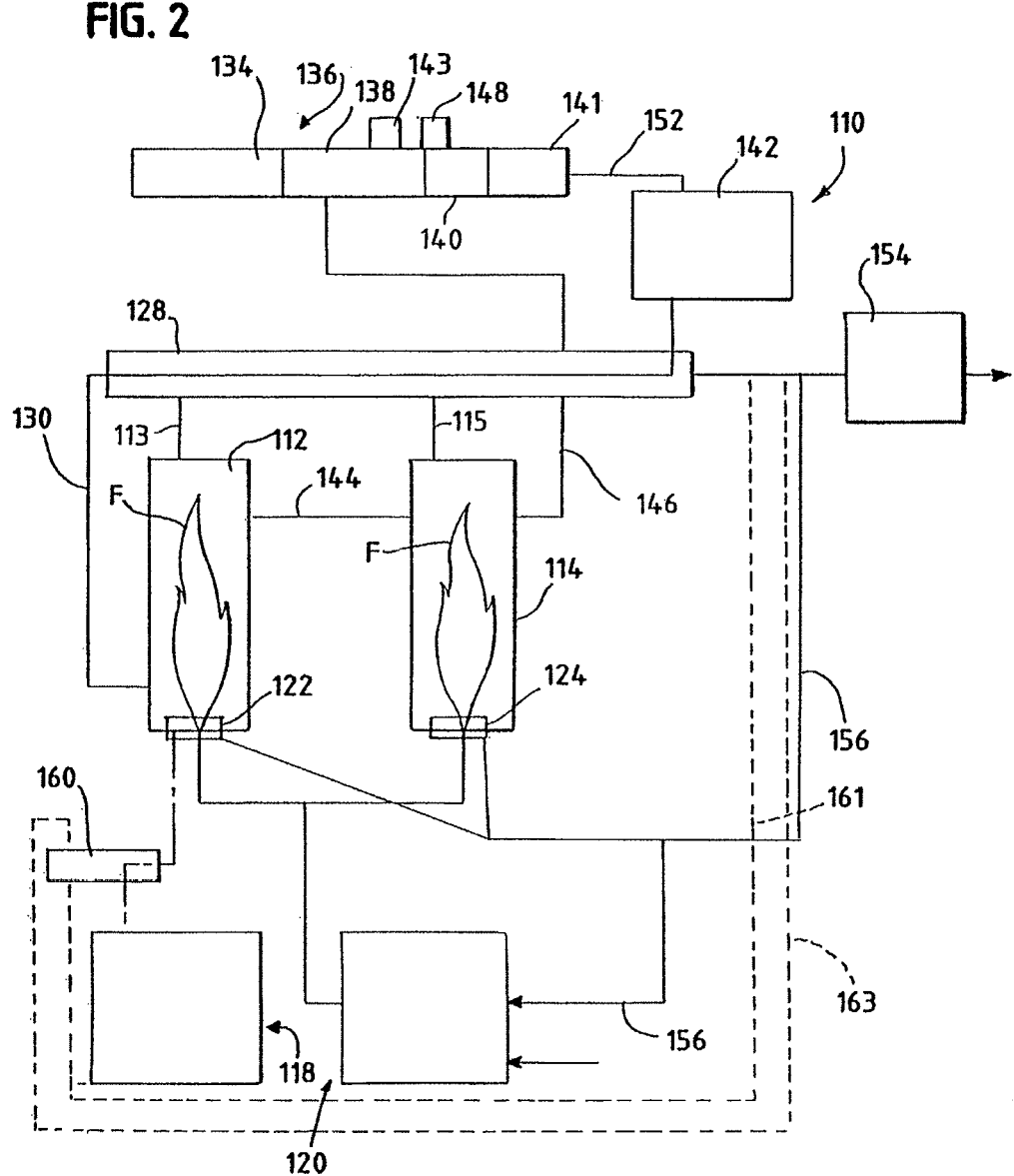
FIG. 2 is a schematic flow diagram of a non-reheat/subcritical boiler system having module based oxy fuel boilers embodying the principles of the present invention.

A schematic illustration of a second embodiment of a boiler system 110 is shown in FIG. 2. The illustrated boiler system 110 is a non-reheat/subcritical unit, and as such, the system includes two separate and distinct boilers, namely boiler No. 1 (main boiler 112) for producing steam from water and boiler No. 2 (superheat boiler 114) for producing superheated steam. There is no reheat boiler. This system 110 is otherwise similar to the embodiment of the system 10 of FIG. 1 and includes oxidizing agent and fuel supply systems 118, 120 (in independent oxy-fuel combustion systems 122, 124) to independently feed each of the boilers 112, 114. The boiler system 110 includes an economizer 128 that uses flue gas to preheat the feed water prior to introduction to the main boiler 112. Exhaust gases after the economizer 128 can be used to preheat the oxidizing agent in an oxidizing agent preheater 160.

Here too, the boiler system 110 is configured with a turbine/generator set 136 having an electrical generator 134, a high pressure (or main steam) turbine 138, an intermediate pressure turbine 140, a low pressure turbine 141 and a condenser 142.

Feed water enters the main boiler through feed water line 130 and is heated as it flows through the water tubes. The heated fluid is separated and saturated steam exits the main boiler 112 through line 144 and enters the superheat boiler 114 where the steam is heated to a superheated condition. The superheated steam exits the superheat boiler 114 through main steam line 146 and enters the high pressure turbine 138. Unlike the previous embodiment, in this system 110, the steam that exits the high pressure turbine 138 traverses through a cross-over line 143 and enters the intermediate pressure turbine 140 (e.g., there is no reheater). The steam exits the intermediate pressure turbine 140 and traverses through cross-over 148 and enters the low pressure turbine 141. The low pressure steam is then exhausted from the low pressure turbine 141 through low pressure turbine to condenser line 152 and is then returned (pumped) to the main boiler 112 through the economizer 128.

As to the fuel circuit, as with the previous embodiment, fuel and oxidizing agent are fed into each of the boilers 112, 114 independently. The flue gases exit their respective boilers through lines 113 and 115, respectively, and enter the economizer 128 to preheat the main boiler feedwater. The flue gases exit the economizer 128 and can be used to preheat the oxidizing agent in oxidizing agent preheater 160. The exhaust gases, after exiting the economizer 128 are routed to the oxidizing agent preheater 160 (through line 161) and are then returned (through line 163) for introduction to any necessary downstream processing equipment (as indicated at 154) following exit from the economizer 128. Flue gas can be recirculated 156 and/or used as a vehicle to carry the fuel (e.g., pulverized coal) into the boilers 112, 114.

Figure 3:
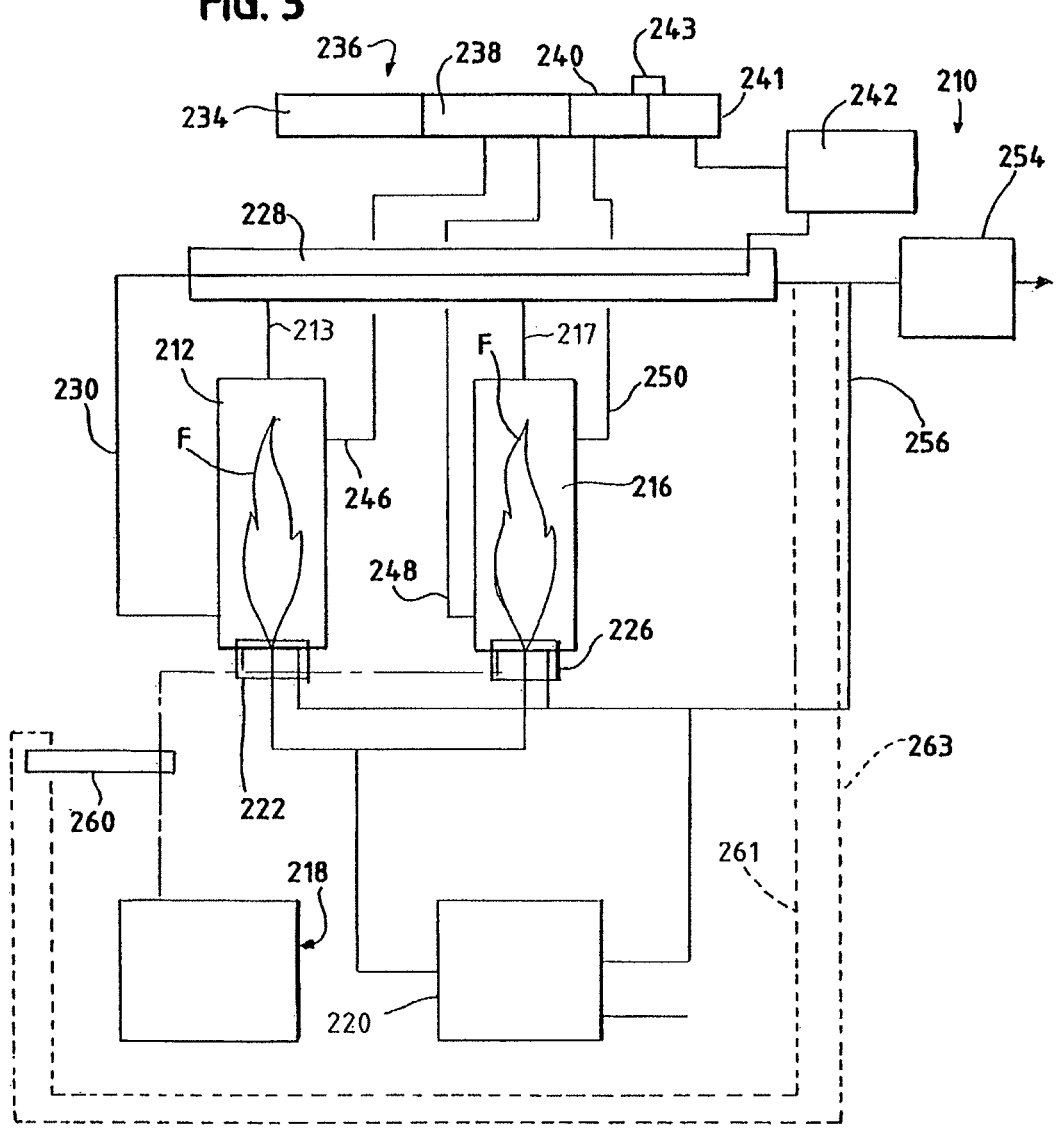
FIG. 3 is a schematic flow diagram of a single reheat/supercritical boiler system having module based oxy fuel boilers embodying the principles of the present invention.

Another embodiment of a boiler system 210 is illustrated in FIG. 3 which shows a single reheat supercritical boiler unit. This system includes two separate and distinct boilers, namely boiler No. 1 (supercritical main boiler 212) for producing supercritical steam from water and boiler No. 2 (reheat boiler 216). Oxygen and fuel (in independent oxy-fuel combustion systems 222, 226) are fed to each of the boilers 212, 216 by oxidizing agent and fuel supply systems 218, 220. The boiler system 210 includes an economizer 228 that uses flue gas to preheat the feed water prior to introduction to the main boiler 212.

Here too, the boiler system 210 is configured with a turbine/generator set 236 having an electrical generator 234, a supercritical turbine 238, an intermediate pressure turbine 240, a low pressure turbine 241 and a condenser 242.

Feed water enters the main boiler 212 through feed water line 230 and is heated as it flows through the water tubes. The heated fluid exits the supercritical boiler 212 through the supercritical steam line 246 and enters the supercritical turbine 238. The fluid (steam) exhausts from the supercritical turbine 238 enters the reheat boiler 216 through reheat line 248 and then flows to the intermediate pressure turbine 240 through reheat steam line 250. The steam exhausts from the intermediate turbine 240 through cross-over 243 into low pressure turbine 241. The low pressure steam exits the low pressure turbine 241 and is condensed in the condenser 242. The condensate is then returned (pumped) to the supercritical boiler 212 through the economizer 228.

As to the fuel circuit, as with the previous embodiments, fuel and oxidizing agent are fed into each of the boilers 212, 216 independently. The flue gases exit their respective boilers through lines 213 and 217, respectively, and enter the economizer 228 to preheat the main boiler feedwater. The flue gases exit the economizer 228 and can be used to preheat the oxidizing agent in oxidizing agent preheater 260. The exhaust gases, after exiting the economizer 228 are routed to the oxidizing agent preheater 260 (through line 261) and are then returned (through line 263) for introduction to any necessary downstream processing equipment 254 as necessary following exit from the economizer 228. Flue gas can be recirculated 256 and/or used as a vehicle to carry the fuel (e.g., pulverized coal) into the boilers.

Still another embodiment of a boiler system 310 is illustrated in FIG. 4 which shows a saturated steam boiler unit. This system includes a saturated steam boiler 312 for producing saturated steam and an oxy-fuel combustion system 322. The boiler system 310 can include an economizer 328 that uses flue gas to preheat the feed water prior to introduction to the main boiler 312.

This boiler system 310 is configured to supply saturated steam to a desired (presently unspecified) downstream process 360. To this end, the system 310 is shown with a "steam requirement" (the downstream process requiring steam) and a condenser 342, the need for which will depend upon the steam requirement 360.

Feed water enters the main boiler 312 through feed water line 330 and is heated as it flows through the water tubes. The heated fluid is separated in, for example, a steam drum 313, into saturated steam and water. The saturated steam exits the boiler 312 from the drum 313 through the steam line 346 and flows to the steam requirement 360. The fluid (steam) can then be condensed in the (optional) condenser 342, which would then be returned (pumped as feedwater) to the boiler 312 through the economizer 328.

As to the fuel circuit, as with the previous embodiments, fuel and oxidizing agent are fed into the boiler 312 through an oxy-fuel combustion system 322. The flue gases exit the boiler 312 through line 313 and enter the economizer 328 to preheat the main boiler 312 feedwater. The flue gases exit the economizer 328 and can be used to preheat the oxidizing agent in oxidizing agent preheater 370. The exhaust gases, after exiting the economizer 328 are routed to the oxidizing agent preheater 370 (through line 371) and are then returned (through line 373) for introduction to any necessary downstream processing equipment 354 as necessary following exit from the economizer 328. Flue gas can be recirculated 356 and/or used as a vehicle to carry the fuel (e.g., pulverized coal) into the boiler 312. Oxygen is supplied by oxidizing agent supply 318 and fuel is supplied by fuel supply 320.

In each of the embodiments of the boiler system 10, 110, 210, 310, the boiler(s) are essentially stand alone units that are constructed to operate so as to maximize heat transfer that occurs by way of a radiant heat transfer mechanism. As such, the boilers are relatively small (to ensure effective exposure of the water walls/tubes T), or at least smaller than a comparable conventional boiler that relies on convective heat transfer. Those skilled in the art will recognize that although each of the boilers in each system (for example the main boiler 12, superheat boiler 14 and reheat boiler 16 of the single reheat boiler system 10) is shown and described as a single boiler unit, it is anticipated that each of these boilers can be configured as multiple units in series. Again, for example, the main boiler 12 could be configured as two or three smaller boilers in series. In addition, although each of the boilers is shown as having one oxy-fuel burner, it is anticipated that each boiler may have multiple burners, as need. It will be appreciated that the use of a single boiler or multiple boilers for each of the heating stages and the use of a single burner or multiple burners for each boiler will further enhance the ability to control the heat input to the individual boilers to more efficiently control the overall process and steam conditions.

As provided in the above-noted patents to Gross, energy is input to the boilers by the oxy-fuel combustion systems. Using such an arrangement, the principle mode of heat transfer to the furnace is radiant, with some convective heat transfer. Because these burners (and the oxy-fuel systems generally) produce high flame temperatures, the oxy fuel combustion systems provide this efficient radiant heat transfer. The geometry of the boiler (e.g., direct flame exposure of the boiler tubes) further increases the heat transfer rate by maximizing the metal surface area over which heat transfer from the flame to the metal occurs.

Advantageously, the present boilers maximize the use of radiant heat transfer in combination with the use of oxy-fuel combustion which may permit the boiler to be physically smaller than a conventional boiler of an about equal size (power output). That is, because essentially pure oxygen (rather than air) is used as the oxidizing agent, the entirety of the oxidizing agent is available for combustion and the volume of gas input to the boiler is about 21 percent of the volume of gas that would be needed if air is used as the oxidizing agent to provide the oxygen necessary for combustion. Thus, the boiler could be considerably smaller because essentially pure oxygen rather than air is used.

In addition, the fuel/oxygen mixture (again, rather than a fuel/air mixture) results in higher flame temperatures in the boilers. Using oxy-fuel, flame temperatures of about 5000° F. in the boiler can be achieved. This is higher, by about 1500° F. to 2000° F., than conventional boilers. It has also been observed that using oxy-fuel, in conjunction with these higher flame temperatures, results in a highly efficient process.

In present boiler systems using natural gas as fuel, the oxygen/natural gas proportions are about 2.36:1. This ratio will vary depending upon the purity of the oxygen supply and the nature of the fuel. For example, under ideal conditions of 100 percent pure oxygen, the ratio is theoretically calculated to be 2.056:1. However, in that the oxygen supply can have a percentage of non-oxygen constituents (generally up to about 15 percent) and natural gas may not always be 100 percent pure, such a variation is expected. As such, those skilled in the art will appreciate and understand that the ratios may vary slightly, but the basis for calculating the ratios, that is approximately stoichiometric proportions of fuel and oxygen, remain true.

This proportion of oxygen to fuel provides a number of advantages. For example, approximately stoichiometric proportions provide for complete combustion of the fuel, thus resulting in a substantially smaller volume of NOx and other noxious off-gas emissions.

It is important to note that accurately controlling the ratio of oxygen to fuel assures complete combustion of the fuel. This is in stark contrast to conventional (for example, fossil fueled electric generation power plants), that struggle with LOI (loss on ignition). Essentially, LOI equates to incomplete combustion of the fuel. The present boiler systems 10, 110, 210, 310, on the other hand, use substantially pure oxygen, in tightly controlled near stoichiometric proportion to the fuel (with boilers that are "tight", that is, configured to essentially prevent the introduction of air), in an attempt to minimize and possibly eliminate these losses. In addition, when using these burners (in an oxy-fuel system), the only theoretical NOx available is from fuel-borne nitrogen, rather than that which could otherwise result from combustion using air. Thus, NOx, if not completely eliminated is reduced to an insignificant amount compared to conventional combustion systems Moreover, because radiant heat transfer is the desired heat transfer mechanism, less reliance is made on convective (gas) passes within the boiler. This too permits a smaller, less complex boiler design. These design considerations allow the boilers to be configured as stand alone, modular units. That is, referring to FIG. 1, a stand alone main boiler 12 can be grouped with a stand alone superheat boiler 14 which can grouped with a stand alone reheat boiler 16. Likewise, referring to FIG. 3, a stand alone supercritical main boiler 212 can be grouped with a stand alone reheat boiler 216 as the core of the boiler system 210. This stand alone configuration gives control advantages over conventional systems where the temperature of the superheated steam is controlled by atemperation (desuperheat). The desuperheat process cools the superheated steam by the addition of water or steam (as vapor or spray) and drops the efficiency of the system and can be eliminated by using separate boilers for boiling and superheating. There are also advantages during turn down operation (operating at less capacity than design capacity). Under turn down conditions the heat input into the boiling region can be controlled independently of the heat input into the superheat region or reheat region and leads to more efficient operation.

A study of heat and mass balances around the various boiler configurations shows that the projected boiler efficiencies are quite high, and considerably higher than known boiler systems. For example, in the first, reheat/subcritical unit, in the main boiler, the change in enthalpy of the water inlet to the steam outlet is about 1.95E9 BTU/hr with a fuel input enthalpy of about 2.08E9 BTU/hr. In the superheat boiler, the change in enthalpy of the steam inlet to the steam outlet is about 7.30E8 BTU/hr with a fuel input enthalpy of about 8.32E8 BTU/hr, and in the reheat boiler, the change in enthalpy of the water inlet to the steam outlet is about 5.52E8 BTU/hr with a fuel input enthalpy of about 6.22E8 BTU/hr. These result in efficiencies in the main boiler, the superheat boiler and the reheat boiler of 93.8% (including economizer gain), 87.8% and 88.7%, respectively.

Likewise, in the second, non-reheat, subcritical unit, in the main boiler, the change in enthalpy of the water inlet to the steam outlet is about 1.99E9 BTU/hr with a fuel input enthalpy of about 1.97E9 BTU/hr. In the superheat boiler, the change in enthalpy of the steam inlet to the steam outlet is about 1.22E9 BTU/hr with a fuel input enthalpy of about 1.60E9 BTU/hr. These result in efficiencies in the main boiler and the superheat boiler of 101.0% (including economizer gain) and 76.2%, respectively. It is important to note that the economizer is included in the calculations for the main boiler (which takes exhaust from both the boiler and superheating boiler) and as such, credit is taken for the exhaust gas energy from the superheating boiler which allows the efficiency to appear to be greater than 100% (which it is not).

In the third, reheat-supercritical boiler, in the supercritical main boiler, the change in enthalpy of the water inlet to the steam outlet is about 2.37E9 BTU/hr with a fuel input enthalpy of about 2.72E9 BTU/hr. In the reheat boiler, the change in enthalpy of the steam inlet to the steam outlet is about 6.23E8 BTU/hr with a fuel input enthalpy of about 7.24E8 BTU/hr. These result in efficiencies in the supercritical main boiler and the reheat boiler of 87.2% (including economizer gain) and 86.0%, respectively.

In the last or the saturated steam boiler system, the change in enthalpy of the water inlet to the steam outlet is about 3.42E9 BTU/hr with a fuel input enthalpy of about 3.73E9 BTU/hr. There is a blowdown loss of about 0.13E8 BTU/hr. This result in an efficiency in the main boiler of 91.7%.

Table 1 below shows partial mass and energy balance components for the reheat/subcritical unit broken down by boilers. Table 2 shows partial mass and energy balance components for the non-reheat/subcritical unit broken down by boilers, Table 3 shows partial mass and energy balance components for the reheat-supercritical boiler unit broken down by boilers, and Table 4 shows partial mass and energy components for the saturated steam boiler unit. It should be noted that the partial mass and energy balance values in Table 3 for the reheat-supercritical boiler unit show first and second boiler sections, which have been added together to determine the efficiency and to conform to the schematic illustration of FIG. 3. In each of the partial mass and energy balance value summaries in Tables 1-3, the specific and total enthalpy values are water inlet to the respective first combustion section before the economizer.

TABLE 1

Partial Mass and Energy Balance for Reheat/Subcritical Boiler System

| | Flow (lb/hr) | Specific Enthalpy (BTU/lb) | Total Enthalpy (BTU/hr) |
|---|---|---|---|
| Main Boiler | | | |
| Water Inlet | 2,665,801 | 447.58 | 1,193,152,718 |
| Steam Outlet | 2,639,407 | 1,190.70 | 3,142,753,707 |
| Change in Enthalpy | — | — | 1,949,600,989 |
| Fuel Inlet Enthalpy | — | — | 2,078,881,200 |
| Superheat Boiler | | | |
| Steam Inlet | 2,639,407 | 1,190.70 | 3,142,753,707 |
| Steam Outlet | 2,639,407 | 1,467.40 | 3,873,076,529 |
| Change in Enthalpy | — | — | 730,322,821 |
| Fuel Inlet Enthalpy | — | — | 832,249,524 |
| Reheat Boiler | | | |
| Steam Inlet | 2,491,642 | 1,302.09 | 3,244,330,446 |
| Steam Outlet | 2,491,692 | 1,523.59 | 3,796,230,559 |
| Change in Enthalpy | — | — | 551,900,113 |
| Fuel Inlet Enthalpy | — | — | 622,050,305 |

TABLE 2

Partial Mass and Energy Balance for Non-Reheat/Subcritical Boiler System

| | Flow (lb/hr) | Specific Enthalpy (BTU/lb) | Total Enthalpy (BTU/hr) |
|---|---|---|---|
| Main Boiler | | | |
| Water Inlet | 3,338,027 | 486.17 | 1,622,853,948 |
| Steam Outlet | 3,304,978 | 1,093.39 | 3,613,619,311 |
| Change in Enthalpy | — | — | 1,990,765,363 |
| Fuel Inlet Enthalpy | — | — | 1,969,222,441 |
| Superheat Boiler | | | |
| Steam Inlet | 3,304,978 | 1,093,39 | 3,613,619,311 |
| Steam Outlet | 3,304,978 | 1,464.03 | 4,838,598,409 |
| Change in Enthalpy | — | — | 1,224,979,098 |
| Fuel Inlet Enthalpy | — | — | 1,602,594,525 |

TABLE 3

Partial Mass and Energy Balance for Reheat/Supercritical Boiler System

|  | Flow (lb/hr) | Specific Enthalpy (BTU/lb) | Total Enthalpy (BTU/hr) |
|---|---|---|---|
| Supercritical Main Boiler (First section) | | | |
| Water Inlet | 2,550,921 | 536.43 | 1,368,390,200 |
| Steam Outlet | 2,550,921 | 1,221.90 | 3,116,965,444 |
| Change in Enthalpy | — | — | 1,748,575,244 |
| Fuel Inlet Enthalpy | — | — | 1,995,760,950 |
| Supercritical Main Boiler (Second section) | | | |
| Steam Inlet | 2,550,921 | 1,221.90 | 3,116,965,444 |
| Steam Outlet | 2,550,921 | 1,466.18 | 3,740,107,987 |
| Change in Enthalpy | — | — | 623,142,543 |
| Fuel Inlet Enthalpy | — | — | 724,457,506 |
| Reheat Boiler | | | |
| Steam Inlet | 2,303,082 | 1,297.29 | 2,987,769,879 |
| Steam Outlet | 2,303,082 | 1,543.11 | 3,553,906,020 |
| Change in Enthalpy | — | — | 566,136,141 |
| Fuel Inlet Enthalpy | — | — | 645,370,183 |

TABLE 4

Partial Mass and Energy Balance for Saturated Steam Boiler System

| Main Boiler | Flow (lb/hr) | Specific Enthalpy (BTU/lb) | Total Enthalpy (BTU/hr) |
|---|---|---|---|
| Water Inlet | 3,401,777 | 170.78 | 580,969,557 |
| Steam Outlet | 3,368,095 | 1,189.06 | 4,004,874,525 |
| Change in Enthalpy | — | — | 3,423,904,968 |
| Fuel Inlet Enthalpy | — | — | 3,731,946,814 |

As set forth above, each of the boiler systems departs from conventional processes in two principal areas. First, conventional combustion processes use air (as an oxidizing agent to supply oxygen), rather than essentially pure oxygen, for combustion. The oxygen component of air (about 21 percent) is used in combustion, while the remaining components (essentially nitrogen) are heated in and exhausted from the furnace. Second, the present process uses oxygen and fuel in a near stoichiometric proportion to one another (within a tolerance of about ±5 percent). That is, only enough oxidizing agent is fed in proportion to the fuel to assure complete combustion of the fuel within the predetermined tolerance. And, this is carried out in multiple boiler components or modules configured as a coordinated system, each module heating in a respective, desired stage (e.g., main boiler, superheat region, reheat region).

Many advantages and benefits are achieved using the present combustion system. It has been observed, as will be described below, that fuel consumption, to produce an equivalent amount of power or heat is reduced. Significantly, this can provide for a tremendous reduction in the amount of pollution that results. Again, in certain applications, the emission of NOx can be reduced to essentially zero.

In addition, it has been observed that because the throughput of gases is considerably lower than conventional boilers the volume of discharge of exhaust gases is commensurately lower. In fact, in that the input of oxidizing agent (oxygen in the present system compared to air in conventional system) is about 21 percent of conventional systems, the discharge is also about 21 percent of conventional systems (with solid fuels this may be, for example, 40 percent in that there is a quantity of motivating gas needed to move the solid fuel into the boiler). And, it is anticipated that the principle constituent of the discharge gases will be water (as vapor) which can be condensed or otherwise released and CO2. It is also anticipated that the CO2 is captured in concentrated form for use in other industrial and/or commercial applications and/or for sequestration.

It has also been found that using a fuel/oxygen mixture (again, rather than a fuel/air mixture) results in higher flame temperatures as discussed above. Using oxy-fuel, flame temperatures of about 5000° F. can be achieved. This is higher, by about 1500° F. to 2000° F., than other, known boilers. It has also been observed that using oxy-fuel, in conjunction with these higher flame temperatures, results in an extremely highly efficient process.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims. The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A boiler system for producing steam from water, the boiler system comprising:
  a first radiant heat boiler having a first boiler inlet and a plurality of first boiler tubes for carrying fluid, the plurality of first boiler tubes forming a fluid wall, said first boiler inlet being in flow communication with said plurality of first boiler tubes,
    wherein the first radiant heat boiler receives, at a first oxy-fuel burner, oxygen having a purity of at least 85 percent and a carbon based fuel at a first predetermined proportion, and
    wherein the first radiant heat boiler produces steam according to a first predetermined energy transfer function;
  a second superheat boiler having a second boiler inlet configured to receive said steam produced by said first boiler and a plurality of second boiler tubes, said second boiler being in series with the first boiler,
    wherein the second superheat boiler receives, at a second oxy-fuel burner, oxygen and a carbon based fuel,
    wherein the second superheat boiler produces steam according to a second predetermined energy transfer function;
  a third reheat boiler having a third boiler inlet and a plurality of third boiler tubes, said third boiler inlet being in flow communication with said plurality of third boiler tubes, wherein the third reheat boiler receives, at a third oxy-fuel burner, oxygen having a purity of at least 85 percent and a carbon based fuel at a third predetermined proportion,
wherein steam from the second superheat boiler is fed to into said third reheat boiler inlet and heated by said third reheat boiler;
wherein the third reheat boiler produces steam according to a third predetermined energy transfer function;
an intermediate pressure turbine, wherein steam produced by the third reheat boiler is fed to the intermediate pressure turbine;
a low pressure turbine, wherein steam exhausted from the intermediate pressure turbine is fed to the low pressure turbine, and wherein steam exhausted from the low pressure turbine is fed to a condenser;
an economizer having a gas side and a feedwater side, wherein exhaust gases from each of the first radiant heat boiler and the second superheat boiler flow into the economizer's gas side, and wherein feedwater flows through the economizer and into the first boiler inlet.

2. The boiler system of claim 1, wherein the second superheat boiler receives, at the second oxy-fuel burner, oxygen having a purity of at least 85 percent and a carbon based fuel at a second predetermined proportion.

3. The boiler system in accordance with claim 1, wherein the first radiant heat boiler and the second superheat boiler are solid fuel boilers.

4. The boiler system in accordance with claim 1, wherein at least a portion of said exhaust gases is used to carry solid fuel into the first radiant heat boiler or the second superheat boiler.

5. The boiler system in accordance with claim 1, wherein exhaust gases exhausting from the economizer's gas side are used to preheat an oxygen supply for the first radiant heat boiler or the second superheat boiler.

6. The boiler system in accordance with claim 1, wherein the first radiant heat boiler is configured to be in flow communication with a main steam turbine and said second superheat boiler is in flow communication with the intermediate pressure turbine, wherein steam exiting the first radiant heat boiler is fed to the main steam turbine, steam exhausted from the main steam turbine is fed to the second superheat boiler, and steam exiting the second superheat boiler is fed to the intermediate pressure turbine.

7. The boiler system in accordance with claim 6, further comprising an economizer having a gas side and a feedwater side, wherein exhaust gases from the first radiant heat boiler and the second superheat boiler exhaust through the economizer, and wherein feedwater from the condenser flows through the economizer and into a feedwater inlet of the first radiant heat boiler.

8. The boiler system in accordance with claim 7,
wherein at least one of the first radiant heat boiler and the second superheat boiler is a solid fuel boiler, and
wherein a portion of the exhaust gases is used to carry solid fuel into the at least one of the first radiant heat boiler and the second superheat boiler.

9. The boiler system in accordance with claim 8, wherein the portion of the exhaust gases, that is used to carry solid fuel into the at least one of the first radiant heat boiler and the second superheat boiler, exhausts from an exhaust gas flow path downstream of the economizer.

10. A method for superheating steam from a first radiant heat boiler in a second superheat boiler coupled with an oxy-fuel burner system, said second superheat boiler having:
a steam inlet for receiving steam; and
a plurality of boiler tubes in flow communication with said steam inlet forming at least one tube wall for receiving said steam,
wherein said second superheat boiler is configured to substantially prevent the introduction of air, and said oxy-fuel burner system receiving a carbon based fuel and oxygen having a purity of at least 85 percent,
wherein the oxygen and the carbon based fuel are fed into the said oxy-fuel burner system in a predetermined proportion, the method comprising:
(a) feeding steam from said first radiant heat boiler to the second superheat boiler;
(b) superheating steam from said first radiant heat boiler via said second superheat boiler to create superheated steam;
(c) feeding said superheated steam to a high pressure turbine;
(d) feeding steam exhausted from said high pressure turbine to a reheat boiler;
(e) feeding steam from said reheat boiler to an intermediate pressure turbine;
(f) feeding steam from said intermediate pressure turbine to a low pressure turbine;
(g) condensing the steam from the low pressure turbine;
(h) feeding exhaust gases from each of the first radiant heat boiler an the second superheat boiler to an economizer to heat a feedwater stream flowing into the first radiant heat boiler.

11. The method as recited in claim 10, wherein said predetermined proportion is a stoichiometric proportion, wherein said stoichiometric proportion limits an excess of either the oxygen or the carbon based fuel to a predetermined tolerance.

12. The method as recited in claim 10, wherein said predetermined proportion provides an amount of oxygen in excess of a stoichiometric proportion.

13. The method of claim 10, wherein at least a portion of said exhaust gases are used to carry the carbon based fuel into the said oxy-fuel burner system.

* * * * *